(12) United States Patent
Montarras

(10) Patent No.: US 9,638,563 B2
(45) Date of Patent: May 2, 2017

(54) DEVICE FOR POWDERED PRODUCTS

(71) Applicant: NESTEC S.A., Vevey (CH)

(72) Inventor: Marc Montarras, Pully (CH)

(73) Assignee: Nestec S.A., Vevey (SE)

( * ) Notice: Subject to any disclaimer, the term of this patent is extended or adjusted under 35 U.S.C. 154(b) by 0 days.

(21) Appl. No.: 14/915,377

(22) PCT Filed: Aug. 28, 2014

(86) PCT No.: PCT/EP2014/068264
§ 371 (c)(1),
(2) Date: Feb. 29, 2016

(87) PCT Pub. No.: WO2015/028551
PCT Pub. Date: Mar. 5, 2015

(65) Prior Publication Data
US 2016/0209258 A1    Jul. 21, 2016

(30) Foreign Application Priority Data

Aug. 29, 2013 (EP) .................................... 13182300

(51) Int. Cl.
| A47J 43/28 | (2006.01) |
| G01F 19/00 | (2006.01) |
| A47F 13/08 | (2006.01) |

(52) U.S. Cl.
CPC ............ *G01F 19/002* (2013.01); *A47F 13/08* (2013.01); *A47J 43/28* (2013.01)

(58) Field of Classification Search
CPC .......... G01F 19/002; A47J 43/28; A47F 13/08
USPC .................................................. 294/176, 177
See application file for complete search history.

(56) References Cited

U.S. PATENT DOCUMENTS

| 959,189 | A | * | 5/1910 | Wyant | ..................... B26B 29/02 |
| | | | | | 30/312 |
| 1,543,209 | A | | 3/1920 | Fulton | |
| 2,795,043 | A | | 6/1957 | Fleischer | |
| 4,646,795 | A | * | 3/1987 | Hebron | ..................... A01K 5/00 |
| | | | | | 141/344 |
| 5,642,689 | A | | 7/1997 | Harvey | |
| 7,225,584 | B1 | | 6/2007 | Speidell | |

FOREIGN PATENT DOCUMENTS

| GB | 634936 | 3/1950 |
| WO | 2005120709 | 12/2005 |

* cited by examiner

*Primary Examiner* — Patrick Maestri
(74) *Attorney, Agent, or Firm* — K&L Gates LLP

(57) ABSTRACT

The present invention relates to a device (1) having a tubular shape, comprising a body (2) and at least two extremities (3a, 3b), wherein at least one of these extremities (3a, 3b) has a V-shape (4) and comprises an opening (5) forming an ellipse (6), and wherein the angle α between i) the central and longitudinal axis (7) of the device (1) and ii) the tangential line (8) formed by said V-shape (4) is lower than 10°.

22 Claims, 10 Drawing Sheets

DEVICE FOR POWDERED PRODUCTS

CROSS REFERENCE TO RELATED APPLICATIONS

The present application is a National Stage of International Application No. PCT/EP2014/068264, filed on Aug. 28, 2014, which claims priority to European Patent Application No. 13182300.7, filed Aug. 29, 2013, the entire contents of which are being incorporated herein by reference.

FIELD OF THE INVENTION

The present invention relates to a device having a particular shape, which is particularly adapted to extract, contain, transport, deliver and/or dose products having a powder form.

BACKGROUND OF THE INVENTION

Products, especially consumer goods, exist under different physical forms. For example they can be solid, liquid or viscous. When being solid, a product can be under the powder form, that is to say a granulated form. This specific form is particularly suitable to facilitate dispensing the product as this one consists on solid and fine particles. The quantity of extracted and delivered product will also be more adjustable.

A product can be stored into various types of containers (packages, pouches, boxes, bottles . . . ) that can be made of different kinds of material (plastic, glass, metal, card . . . ). The containers can also have different shapes. They can be rigid or on the contrary flexible or semi-flexible, especially if a flexible material such as a plastic film, paper and/or aluminium is used for their manufacture. The containers fulfil several functions. They not only allow to condition, transport, store and distribute the products to the consumers in a safe, hygienic and convenient way, but they may also provide with a visual support for commercial advertisement.

Various devices exist to extract and deliver the product or a part thereof from a container, such as dispenser glass, beakers, spoons or scoops, and they can have diverse shapes. For example, consumers generally use a plastic cup to extract and dose washing powders. Concerning powdered food products such as coffee powder, chocolate powder, infant formula and infant cereals, the consumers typically use a spoon or a scoop. These ones generally consist of a handle with a little cavity (or small dish). Some examples of scoops can be found in WO2012009124 and in WO201285783.

However, the existing devices present some disadvantages. When transferring the product using these devices from a container to its place of use (for example to a cup or a baby's bottle . . . ), a part of the powdered product can fall and be lost. This is particularly due to the high amount of powder in the device, the speed of serving and/or the flowability of the product, which is increased when the size of the powder granules decreases. The cavity (or small dish) of the existing spoons and scoops cannot retain all the powder that it contains due to its little size and its open shape. This loss of product represents an economical drawback for the consumers who will have to throw away the lost powder. This may also cause some annoyances to the consumers since the place of transfer will become dirty as it will be full of lost powder.

In addition, the existing devices do not always allow a precise dosage of the powdered products. This is especially the case when using spoons and scoops since the powdered product will tend to form a pile on the top of the cavity (or small dish) when it is extracted.

There is therefore a need to develop a device which allows extracting a powdered product from a container and optionally dosing the extracted amount in the same time. There is also a need of a device that is able to deliver the product with no or limited product losses and that can also be used on a wide range of powdered products.

Object of the Invention

It is therefore an object of the present invention to provide a device having a tubular shape, comprising a body and at least two extremities, wherein at least one of these extremities has a V-shape and comprises an opening forming an ellipse, and wherein the angle $\alpha$ between the central longitudinal axis of the device and the tangential line formed by said V-shape is lower than 10°.

Another object of the invention is a kit of part comprising the device of the present invention and a container comprising a powdered product.

The invention also relates to the use of the device of the present invention to extract, contain, transport, deliver and/or dose a powdered product, such as a food product, in particular a powdered bouillon, a powdered soup, an infant formula, an infant cereal, a coffee powder, a chocolate powder or any other kind of powder.

Another object of the invention is a process to extract, contain, transport, deliver and/or dose powdered product using the device of the invention.

SUMMARY OF THE INVENTION

Thus, a first object of the invention is a device having a tubular shape, comprising a body and at least two extremities, wherein at least one of these extremities has a V-shape and comprises an opening forming an ellipse, and wherein the angle $\alpha$ between i) the central and longitudinal axis of the device and ii) the tangential line formed by said V-shape, is lower than 10°.

It is noted that the various aspects, features, examples and embodiments described in the present application may be compatible and/or combined together.

The device of the invention has a tubular shape defining an enclosed volume that can contain some products. It comprises a body (which is a tube) delimited by at least two extremities. The tube has a wall which is delimited by an internal side and an external side, and the wall thickness can measure from less than one millimeter to a few centimeters, such as from 0.1 mm to 2 cm, or from 0.5 mm to 1.5 cm, or from 0.8 mm to 1 cm.

The device has generally two extremities. These extremities are typically located at the opposite—so generally a bottom extremity and a top extremity when the device is considered vertically/upright—but not necessarily. However there can be some embodiments where the device may have more extremities (e.g. 3, 4 . . . ), for example a bottom extremity and two top extremities.

The device of the present invention can have various shapes. In some embodiments, it has a longitudinal shape. In some other embodiments, it has a curve shape.

The shape of the device, especially the shape of the body and/or the extremities of the device, will be adapted depending on the uses, the kind of products and/or the type of consumers.

In some embodiments the device of the invention and/or the body of the device of the invention has/have a regular shape. This means that the diameter of the device (i.e. of the tube) and/or of the body (i.e. of the tube of the body) is constant along its length. The diameter of the tube of the device is generally from few to several centimeters, such as from 10 mm to 50 mm, or from 10 to 35 mm, or from 10 mm to 20 mm.

In some other embodiments the device of the invention and/or the body of the device of the invention has/have an irregular shape. This means that the diameter of the device and/or of the body is not constant along its length, that is to say it varies along its length. The variation can be regular such as proportional (e.g. a proportional decrease from the top of the device to the bottom of the device), for example it can have a funnel shape, or the variation can be irregular (e.g. a random variation).

The device of the invention and/or the body of the device of the invention can also have both regular and irregular shapes, that is to say that at least a part of the device/body of the device has a regular shape and another part has an irregular shape.

As for the diameter of the tube, the width of the tube can also be constant along its length, not constant along its length or a mix thereof. For example, the device having a conical shape (i.e. a funnel shape) has a greater width at the wider opening than at the narrower opening.

The tube of the device can have a regular or irregular shape. The cross-section of the tube can for example form a circle, an oval or it can have concave or convex shape, such as the shape of a crescent moon for example.

The extremities of the device can have the same or a different shape. In several embodiments, the extremities of the device have a different shape.

At least one extremity of the device according to the invention has a V-shape (i.e. a bevelled extremity). This is generally the bottom extremity. In some particular embodiments, all the extremities of the device have a V-shape.

The V-shape can end by a peak or a point or it can form a little curve. In some advantageous embodiments the V-shape ends by a little curve. In this particular embodiment, at least one extremity of the device according to the invention has a U-shape.

This at least one extremity having a V-shape comprises an opening having an ellipse form (the opening is oblique to the length of the device), i.e. an opening forming an ellipse. In some embodiments, only a part of the opening has an ellipse form. In a particular embodiment, at least the upper part of the extremity having a V-shape has an ellipse form. In some embodiments, the entire opening has an ellipse form.

The V-shape can be obtained by cutting obliquely to the central and longitudinal axis of the device thereby obtaining a bevelled extremity.

In particularly advantageous embodiments, this opening is cut sharp for the device to be better inserted into the powdered product.

In some embodiments the other extremity (or extremities) of the device according to the invention can also comprise an opening that can be oblique or perpendicular to the length of the device and that can be sharp or irregular. This is generally the top extremity (or extremities).

The device of the present invention can therefore comprise at least:
one extremity having a V-shape and comprising an opening forming an ellipse (typically the bottom extremity),
one extremity comprising an opening (typically the top extremity).

In some other embodiments of the invention, the other extremity (or extremities) of the device can be closed.

The device of the present invention can therefore comprise at least:
one extremity having a V-shape and comprising an opening forming an ellipse (typically the bottom extremity),
one extremity that is closed (typically the top extremity).

This closed extremity can be sealed. It can have different types of shape such as being a curve, being straight or comprising design patterns. The presence of design patterns could be part of the general design of the device and/or it may also help the consumer to better handle the device of the invention.

The device of the invention is generally a vertical device that is to say when it is used, it will be placed vertically/upright (even if it can be stored horizontally for example). Indeed, one particular advantage of the present invention over a spoon or a scoop for example is that the device can be used vertically to transfer a product, without this product falling over or slipping from the device, so there is no loss of the product during the transfer. It means that the consumer does not need to pay a particular attention to hold laterally or horizontally the device containing the product to transfer the product. Even if it is advantageous to use the device vertically/upright, it remains however possible to use the device laterally (obliquely) or horizontally. As previously mentioned the extremity having a V-shape and comprising an opening forming an ellipse is generally the bottom extremity of the device and the powder product will enter into the device by this particular extremity.

The angle $\alpha$ between i) the central and longitudinal axis of the device and ii) the tangential line formed by the V-shape of the at least one extremity is lower than 10°. Indeed, when this angle $\alpha$ is 10° or more, it will not be possible to suitably extract the powdered product from the container: the product will not remain into the device as it will slip.

The angle $\alpha$ is typically from 4 to 9.5°, or from 4 to 9°, or from 5 to 9° or from 5 to 8°. The angle $\alpha$ can be for example 4, 5, 6, 7, 8 or 9° or it can have any in-between value such as any decimal in-between value (4.1, 4.2, 4.3 etc). An angle $\alpha$ of 7° is a particularly advantageous example.

The ellipse forming the opening of the at least one extremity having a V-shape is oblique to the length of the device. The angle $\beta$—corresponding to the inclination (or slope) formed by the ellipse of the extremity having a V-shape with the tangential and longitudinal axis of the device—can be from 5 to 30°, or from 8 to 25°, or from 10 to 20°, or from 13 to 18°, such as 13, 14, 15, 16, 17 or 18°, or any in-between value such as any decimal in-between value (13.1, 13.2, 13.3 etc). An angle $\beta$ of 15° is a particularly suitable example.

The device according to the present invention can have a length (l.d.) of few centimeters up to several decimeters. In some embodiments it has a length (l.d.) of from 60 mm to 180 mm, or from 65 to 120 mm, or from 70 to 90 mm. The length (l.d.) is generally measured from the top (or the top extremity) of the device to the bottom (or the bottom extremity) of the device.

The top of the ellipse is generally located at a distance (l.t.e) that is or exceeds half of the length (l.d.) of the device when measured from the top of the device to the top of the ellipse. For example it can be located at ½, ⅔, ¾, ⅘ . . . of the top of the device.

The diameter $\Omega$ of the body (or width of the device) at the top of the ellipse (meaning at the superior edge of the upper part of the opening having a V-shape) can be from few to several centimeters, such as from 10 mm to 40 mm or from 10 mm to 30 mm or from 15 to 25 mm or from 17 to 23 mm. It can be for example 18 or 20 mm.

The length (l.e.) of the ellipse is from few to several centimeters depending on the embodiments. In some embodiments it can be chosen in the range of from 25 mm to 55 mm, or advantageously from 38 mm to 50 mm.

The width (w.e.) of the ellipse is from few to several centimeters depending on the embodiments. In some embodiments it can be chosen in the range of from 9 mm to 14 mm, or advantageously from 10 mm and 13 mm.

In some particular examples of the invention, the ellipse can have the following length (l.e.) and width (w.e.):
  38 mm×10 mm
  40 mm×10 mm
  40 mm×11 mm
  40 mm×12 mm
  41 mm×12 mm
  42 mm×11 mm
  50 mm×13 mm For example, when the angle α is around 9°, the ellipse can have the following range of length (l.e.) and width (w.e.): from 38 mm×10 mm to 42 mm×11 mm. And when the angle α is between 5° to 8°, the ellipse may have the following range of length (l.e.) and width (w.e.): from 40 mm×10 mm to 50 mm×13 mm.

The ratio between the length (l.e.) and the width (w.e.) of the ellipse is generally between 3 and 5, especially between 3 and 4.5, or between 3.3 and 4.1. In some embodiments it can also be between 3.6 and 4.1 such as between 3.8 and 4.

In some advantageous embodiments, the device of the invention comprises at least one graduation onto the device, i.e. on the external surface of the device. It may have at least 2, 3, 4, 5, 6 or even more graduations. The graduation allows the consumer to visually dose the product he fills into the device. For example, stopping filling the product to the third graduation (from the bottom of the device) will allow retaining less product that filling the product to the fourth graduation (from the bottom of the device). If desired the consumer will therefore be able to dose the product according to his wishes and/or his needs, and this process will be reproducible each time he wants a specific amount of products.

The graduations may have any suitable forms. For example the graduation can be of at least one line surrounding entirely or partially the device, or it may also be made by at least one nick surrounding entirely or partially the device. There may also be a number indicating the filling level (such as the quantitative amount of filled product, or the percentage of filling, or simply a digital number like 1, 2, 3 . . . )

When the device has several graduations, they may be separated at a similar or at a different distance (d) from each other.

In some embodiments, each graduation is separated in such a way that the enclosed volume of the device between two successive graduations is similar to the enclosed volume between two other successive graduations. In such as case, the distance (d) may or may not be different depending of the shape of the device (e.g. whether the diameter of the body is constant or not along its length).

The device according to the invention may be made of various kinds of materials. Advantageously the device is made in plastic material. For example it can be made of polypropylene, polyethylene (PE), polyethylene terephthalate (PET), polybutylene, polyolefin, ethylene vinyl acetate, polyamides, polyvinyl chloride, ethylene vinyl alcohol, polyvinylidene chloride, polyvinyl alcohol, silicon or the like.

The device of the present invention may be made by any suitable technique known by a skilled person. For example it may be made by 3D printing, or by using injection methods such as injection molding, which consists of injecting a material in a fusion state into a mold having the desired shape of the device. It may also be made by thermoformation, that is to say by heating the material (e.g. initially in the form of a sheet) then aspiring it into a cavity having the desired shape of the device, then cutting at least one extremity to get the opening of the tubular device according to the invention.

Depending on the embodiments, the device of the invention may be transparent or opaque. A transparent device allows the customer seeing the product filled into the device. This may also be another way for the customers to visually dose the product, in addition and/or instead of the use of graduations on the surface of the device.

The device of the invention is typically rigid or slightly flexible so that the product can stay (at least temporally) inside it. It is advantageously rigid.

As already mentioned, the device according to the invention may have various shapes/designs depending on its uses, the type of product to be filled and/or the targeted customers. He may also have a single or several colours.

For example the device can be a simple monochrome tube (of a regular shape for instance). This might be the case for example for products like infant formula. Or it can have the shape/design of any desired item (provided that the essential features of the device of the invention are present) like a fruit, a vegetable or an animal shape: these shapes/designs are particularly interesting when the customer is a child since he will enjoy using the device. For instance the device may have the form of a carrot, for example with a tube in orange colour and a design pattern (tail of the carrot) in green colour. This will be particularly funny for the child to use this particular device for example with some cacao powder that looks like soil. The device may also for example have the shape of a banana (curve shape) or of a toy figurine, still provided that it has the essential features.

As previously mentioned the device according to the invention is suitable to extract, contain, transport, deliver and/or dose powdered product. The test T as described in the present application may be used to define the suitability of the device. The device of the invention would be particularly efficient when the powdered product has a density from 200 to 600 g/L, for example from 250 to 580 g/L or from 250 to 480 g/L.

The device of the invention would also be particularly efficient when the powdered product has a particle size distribution (i.e. the size of the particle, also called the granulometry) and/or an average particle size distribution (i.e. the average size of the different particles in a container since the size of the particle may vary) from 30 to 500 μm, and especially from 50 to 400 μm, such as from 80 to 300 μm, or from 100 to 200 μm or from 120 to 180 μm. A particular example is a powdered product with an average particle size distribution of 156 μm.

The device of the invention would be particularly efficient when the powdered product has both a density from 200 to 600 g/L, for example from 250 to 580 g/L or from 250 to 480 g/L, and a particle size distribution and/or an average particle size distribution of from 30 to 500 μm, and especially from 50 to 400 μm, such as from 80 to 300 μm, or from 100 to 200 μm, or from 120 to 180 μm.

In addition, the device will also be particularly efficient when the powdered product has a composition allowing it to stick to the inside of the device and/or when it contains some linking or agglomerate agents that make it a little bit sticky, such as glucose and salt. Several powder products contain these ingredients and there are many ways known by a skilled man to get such a powder product. By way of example, the presence of sugar and/or salt (e.g. at least 3% or at least 10% or at least 20% by weight) into the powdered products will allow getting a product that is not too much dry. Another example would be the presence of micro grind coffee (e.g. 3% by weight) in coffee powder.

The powdered product can be very diverse. Advantageously it is a food product but it may also be any other kind of powder products (e.g. washing powder) for which there is an interest for the customers to use a device according to the invention.

The powdered food product can be for example a powdered bouillon (based on vegetables or on meat, that is not in cube but in a dispersed form), a powdered soup, an infant formula, an infant cereal, a coffee powder, a chocolate powder or any other powder or beverage powder. It may be particularly an infant formula, an infant cereal, a coffee powder or a chocolate powder.

Another object of the present invention is a kit (or kit of part or kit-of-part) comprising the device of the present invention and a container comprising (or that can comprise) a powdered product. The container is adapted to receive the powdered product. As previously mentioned the powdered product may be a powdered food product such as a powdered bouillon, a powdered soup, an infant formula, an infant cereal, a coffee powder, a chocolate powder or any other powder.

The container may have any suitable shapes. It may for example comprise a base, an opening, at least one (1, 2, 3, 4 or even more) side walls (but typically 4 side walls) and it can be closed for example with a lid, which avoids hygiene issues as there is no prolonged contact of the content of the container with the air. The lid allows closing or hermetically closing the container. The container may also comprise some retaining means (e.g. retaining elements) for maintaining the lid in its position when it closes the container. A skilled person knows the various lids that can be used. For example the lid can be a separate piece that is added on the top of the container (i.e. at the opening). This one can be screwed or it can simply fit in the body of the container by complementarity of shapes. The lid can also be connected to the container by any linking means (e.g. linking elements) such as a hinge for example.

The type of container will be adapted depending on the powdered product that it can contain. It can also have various shapes. For example the container may be a box, a package, a bottle, a pouch or a tin can. It may be rectangular (parrallepipedic), oval (e.g. tin can, Doy Pack) . . . .

In a specific embodiment the container of the kit is rigid so that it can be easily handled. In some other embodiments it may be flexible or semi-flexible. The container can be made for example with cardboard, glass, plastic or metallic material.

In the kit, the device of the invention can be found either directly into the container, for example into the powdered product, but preferably at the opening or at least close to the opening of the container to avoid the customers to dig their fingers too far into the product, especially for hygiene and convenience reasons.

To provide better hygiene and convenience, the device may advantageously be separated from the powdered product. It may be for example attached under the lid of the container of the kit (i.e. on the internal or interior face of the lid), or onto a layer that is often present on new products at the opening of the container (i.e. above the powdered product). It might also be placed into any other suitable part of the container such as outside the container, for example on the top of the lid, or on one side of the container. In these cases, there may be a little fixing device that helps maintaining the device onto the container. The device may be attached or fixed with any suitable means that the skilled man would easily determine. By way of example only, it may be done via the use of gluing strips or specific fixing elements like flexible tabs holding the device.

The invention is also about the use of the device according to the invention to extract, contain, transport, deliver and/or dose powdered product. It is also about a method to extract, contain, transport, deliver and/or dose powdered product using the device according to the invention. As previously mentioned the powdered product has suitably a density from 200 to 600 g/L, for example from 250 to 580 g/L or from 250 to 480 g/L, and/or a particle size distribution and/or an average particle size distribution from 30 to 500 µm, and especially from 50 to 400 µm, such as from 80 to 300 µm, or from 100 to 200 µm, or from 120 to 180 µm. It may also contain some linking or agglomerate agents. The powdered product may be any kind of products. It can be a powdered food product such as a powdered bouillon (not in cube), a powdered soup, an infant formula, an infant cereal, a coffee powder, a chocolate powder or any other powder or beverage powder.

Each time the consumer wants some powder product, he can open the container, extract some product by filling the device of the invention up to a certain level, then transporting said product from the container to its place of use (for example to a cup or a baby's bottle . . . ), and finally delivering the product to its place of use. With the device of the present invention, the delivery of the product is generally made by tapping the device either with one or several of its fingers, or on the recipient constituting the place of use (for example a cup or a bottle).

Therefore another object of the invention is a process to extract, contain, transport, deliver and/or dose some powdered product comprising the following steps:
a) positioning the device of the invention on top of the container, said container being open and containing some powder product
b) inserting said device into the powder product
c) removing the device, said device now comprising some powder product inside
d) transferring the powder product from the container to its place of use
e) delivering the powder product to or into its place of use
This process may also be used as test T.

In the first step a), the device of the invention is empty. The container is in an opened position that is to say it is possible for the consumer to have access to the content of the container, i.e. to the powder product. The device can be positioned vertically, obliquely or horizontally. Advantageously it is positioned vertically. The extremity having the V-shape is placed at the bottom so that the powder product can enter into the device at step b), thereby filling at least a part of the enclosed volume of the device.

The second step b) is typically made by pressing the device until a certain level. The consumer may press (for example with his hand or fingers) the device into the powder product until a certain level which will allow a certain dosing of the products. Such a dosing depends on the consumer's needs. So the consumer will decide whether he more or less presses the device into the powder product of the container in order to get more or less product. As previously mentioned, the dosing of the product will be visually facilitated by the presence of some graduations on the device and/or by the fact that the device is made of a transparent material.

The device can be inserted vertically, but also obliquely or horizontally. Advantageously it is inserted vertically.

The process may therefore comprise a step b') after step b) and before step c), said step b') consisting of twisting the device on a certain degree, for example from 5 to 360 degrees.

Indeed once inserted the device can also be twisted before proceeding to step c), for example by a few degrees or up to a complete turn. The device can be twisted for instance by 45° (⅛ turn) or by 90° (¼ turn) or by 180° (½ turn) or more. This allows better retaining the powder product inside the device.

In the consecutive step c), the device is removed and surprisingly the powder product remains into it. This is due to the careful selection of the essential features of the device made by the present inventor.

The device may be removed vertically, but also obliquely or horizontally. Advantageously it is removed vertically.

While being transferred during step d), there is no loss or a limited loss of powder product.

As previously described, the delivery step e) is generally made by tapping the device either with one or several of its fingers, or on the recipient constituting the new place of use (new container, plate, bowl, cup or bottle . . . ).

Once the remaining amount of powdered product in the container is limited, it can be gathered in a place of the container such as in one of the corners (for example by inclining the container), to get a sufficient amount of remaining powdered product that can be extracted using the device of the invention.

Once the container does not contain powdered product anymore, several options might be considered by the consumer. For example the container may be used again by filling it with some new powdered products. The consumer may therefore keep using the same kit elements (i.e. both the initial device and the container). On the contrary, the consumer can buy a new container that may contain powdered product but he can still use the same device of the previous kit. Alternatively the consumer may also want to buy another complete new kit.

It should be noted that it might also be possible to buy separately the device of the invention and to use it into a container that may comprise a powdered product.

BRIEF DESCRIPTION OF THE FIGURES

The invention and some particular embodiments thereof will now be described in more details with regard to the accompanying figures. The figures show manners of implementing the present invention and are not to be construed as being limiting to other possible embodiments falling within the scope of the attached claim set.

FIG. 3A is a view of the device (1) from the upper side.
FIG. 3B is a view of the device (1) from the down side.
FIG. 3C is a front side view of the device (1).
FIG. 3D is a hindsight view of the device (1).
FIGS. 3E and 3F are side views of the device (1).
FIG. 3G is a 3D view of this particular device (1).

FIG. 4A is a representation of the front view of the device and FIG. 4B is a 3D view.

Figure 1:
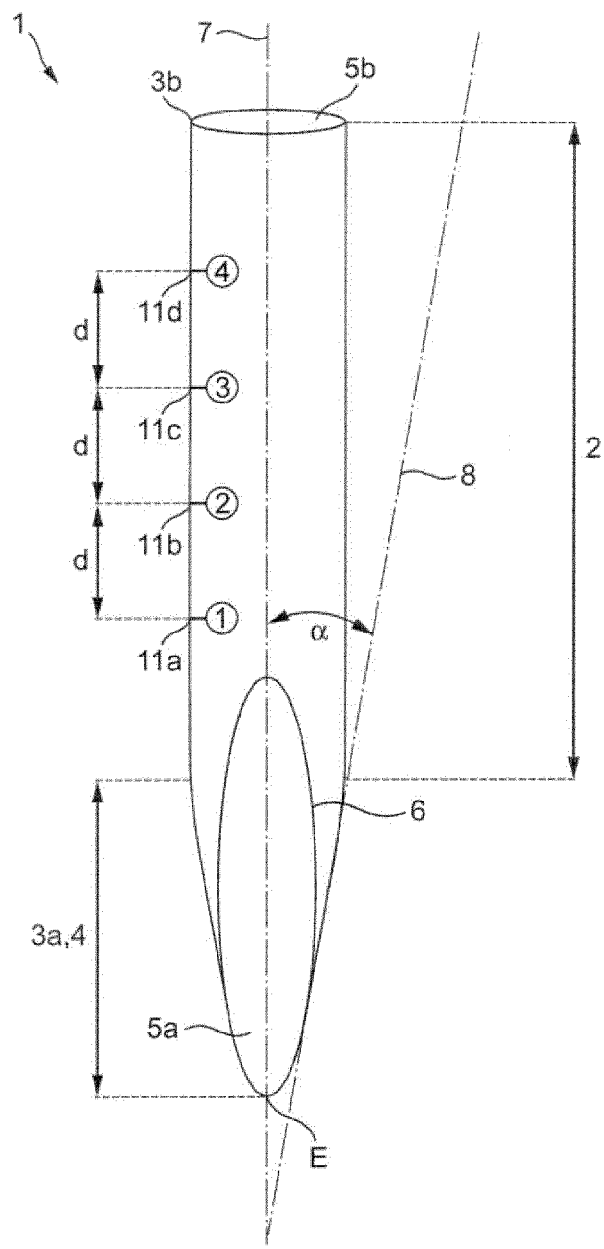
FIG. 1 represents a device according to the invention, having a tubular shape, comprising a body with a regular shape, two extremities:
  one of them has a V-shape and comprises an opening forming an ellipse
  the other extremity comprises an opening.

In the figures and/or description, the reference numbers correspond to the following technical features:
  (1) device
  (2) body of the device (1)
  (3) extremity of the device (1)
  (4) V-shape formed by at least one of the extremities of the device (1)
  (5) opening of the at least one of the extremities of the device (1)
  (6) ellipse formed by the opening (5)
  (7) central and longitudinal axis of the device (1)
  (8) tangential line formed by said V-shape (4)
  (9) tangential and longitudinal axis of the device (1)
  (10) top of the ellipse (6)
  (11) graduation
  (12) powdered product
  (13) container that can comprise a powdered product (12)
  (14) base of the container (13)
  (15) opening of the container (13)
  (16) side wall of the container (13)
  (17) lid of the container (13)
  (18) place of use of the powdered product (12)
  α: angle between the central and longitudinal axis (7) of the device (1) and the tangential line (8) formed by the V-shape (4)

β: angle corresponding to the inclination of the ellipse (6) with the tangential and longitudinal axis (9) of the device (1)
Ω: diameter of the body (2) of the device (1) measured at the top (10) of the ellipse (6)
(l.d.) length of the device (1)
(l.e.) length of the ellipse (6)
(l.t.e) distance from the top of the device (1) to the top (10) of the ellipse (6)
(w.e.) width of the ellipse (6)
(d) distance between two successive graduations (11)
(E) end of the V-shape (4)

DETAILED DESCRIPTION OF SOME EMBODIMENTS OF THE INVENTION

The next paragraphs give the definition of some terms and expressions used in the present application.

By the expressions "device having a tubular shape" or "(hollow) tubular device", it is meant a device having a hollow tubular shape, that is to say the shape of the device is a tube with an enclosed volume that can comprise some product, especially some powdered product. The enclosed volume is bounded (i.e. delimited) by the internal side of the wall of the device having a hollow tubular shape and this enclosed volume is adapted to allow the device containing at least some product. This means that the hollow can have dimensions (e.g. width/length) of from a few millimeters to a few centimeters, for example from 5 mm to 5 cm, such as from 1 cm to 3 cm. For example, the hollow tubular shape may contain at least 0.5 cm$^3$, or at least 1 cm$^3$, or at least 2 cm$^3$, or at least 5 cm$^3$ or at least 8 cm$^3$ or at least 10 cm$^3$ of product.

The dimensions of the hollow of the device can be constant or not along its length. In some embodiments for example, the dimensions of the hollow of the device can decrease from the top extremity to the bottom extremity of the device. In addition, the shape of the enclosed volume can be regular or irregular along the tube. In a particular embodiment, the hollow of the device has constant dimensions and the enclosed volume has a regular shape, for example when the tube delimits a hollow ring of a diameter constant from the top to the bottom extremities.

The "body" or "body of the device" should be understood as the part of the device in-between the at least two extremities of the device. The body generally has a longitudinal axis.

The "diameter of the device" and the "diameter of the body of the device" correspond to the external diameter of the tube (of the device or of its body). It can be measured when the device is cut perpendicularly to its length (i.e. cross-section) and it generally corresponds to the longest distance of the tube that passes through the centre. Depending of the embodiments the tube can have a regular or irregular shape. The cross-section of the tube can for example form a circle. In that case the diameter will correspond to the largest distance (longest chord of the circle) i.e. the straight line segment that passes through the centre of the circle and whose endpoints lie on the circle. The cross-section of the tube can for example form an oval or an ellipse. Again the diameter will correspond to the largest distance that passes through the centre. However for a convex or a concave shape, the diameter is defined to be the largest distance that can be formed between two opposite parallel lines tangent to its boundary.

The "width of the tube" generally corresponds to the shortest (and external) distance of the tube that passes through the centre when the device is cut perpendicularly to its length (i.e. cross-section). However for a convex shape, it is defined to be the shortest distance that can be formed between two opposite parallel lines tangent to its boundary. The width of the tube may correspond to the diameter of the device in some embodiments, for example when the cross-section of the tube forms a circle. In some other embodiments, it will be smaller, for example when the cross-section of the tube forms an oval.

The "diameter Ω" corresponds to the diameter of the tube (of the device or of its body) as measured at the top edge of the ellipse.

Each measure of width, length and diameter is measured externally, unless otherwise specified.

An "extremity" of the device is an end part of the device that can be located at the bottom of the device (i.e. "bottom extremity") or at the top of the device (i.e. "top extremity").

The bottom of the device can be defined at the lowest part of the device when the device is held upright/vertically (that is to say when the extremity having a V-shape and comprising an opening forming an ellipse is located down). The top of the device is defined at the highest part of the device when the device is hold upright/vertically.

By the expression "an extremity has/having a V-shape", it is intended to mean that the shape of the extremity decreases to form a V or a U (i.e. a bevelled extremity). The extremity is terminated (i.e. it ends) by a peak or a point (i.e. the diameter of the tube becomes 0 or is close to 0) or it can form a little curve (i.e. the diameter of the tube does not become 0 or is not close to 0). The end of this extremity having a V-shape is also named E in the present invention. In a particular embodiment, the device has an extremity having a U-shape.

An extremity can contain an opening or it can be closed. In the present invention, at least one of the extremities of the device comprises an opening. An "opening" is a gap. An extremity that is closed means that if we put some powdered product into the device, said product cannot go out through this closed extremity. For example it is a sealed extremity.

Figure 2:
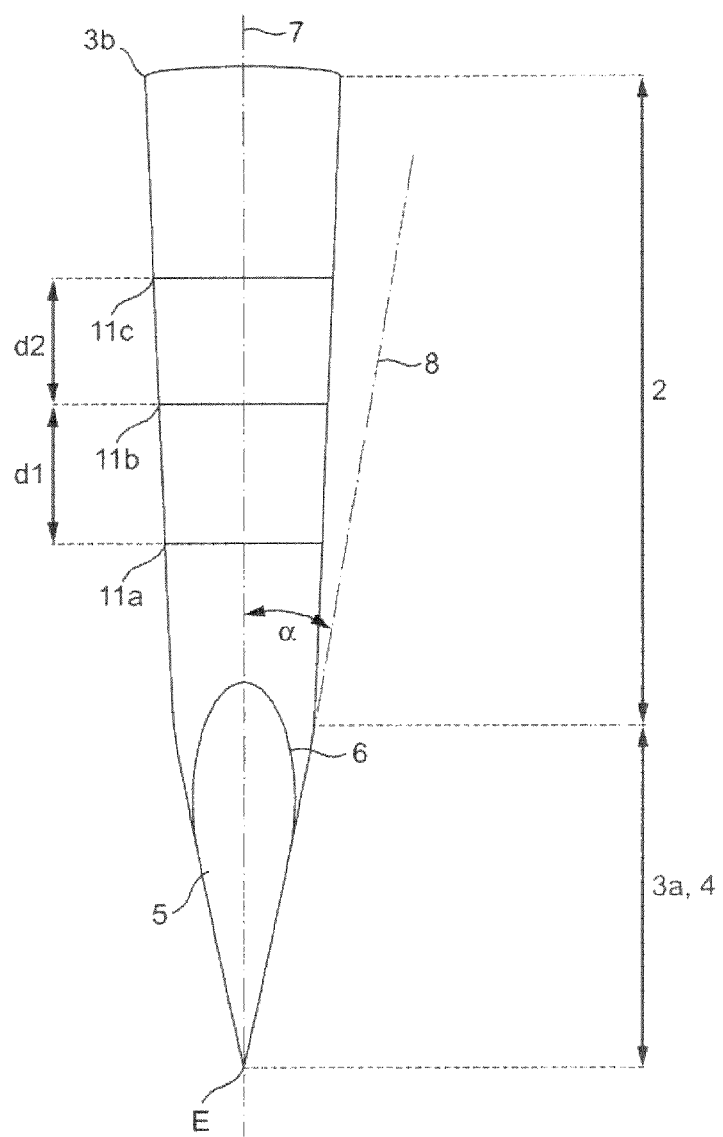
FIG. 2 represents a device according to the invention, having a tubular shape, comprising a body with a funnel shape (an irregular shape having a regular variation of the diameter of the body along its length), two extremities:
  one of them has a V-shape and comprises an opening forming an ellipse
  the other extremity is closed.
Figure 3:
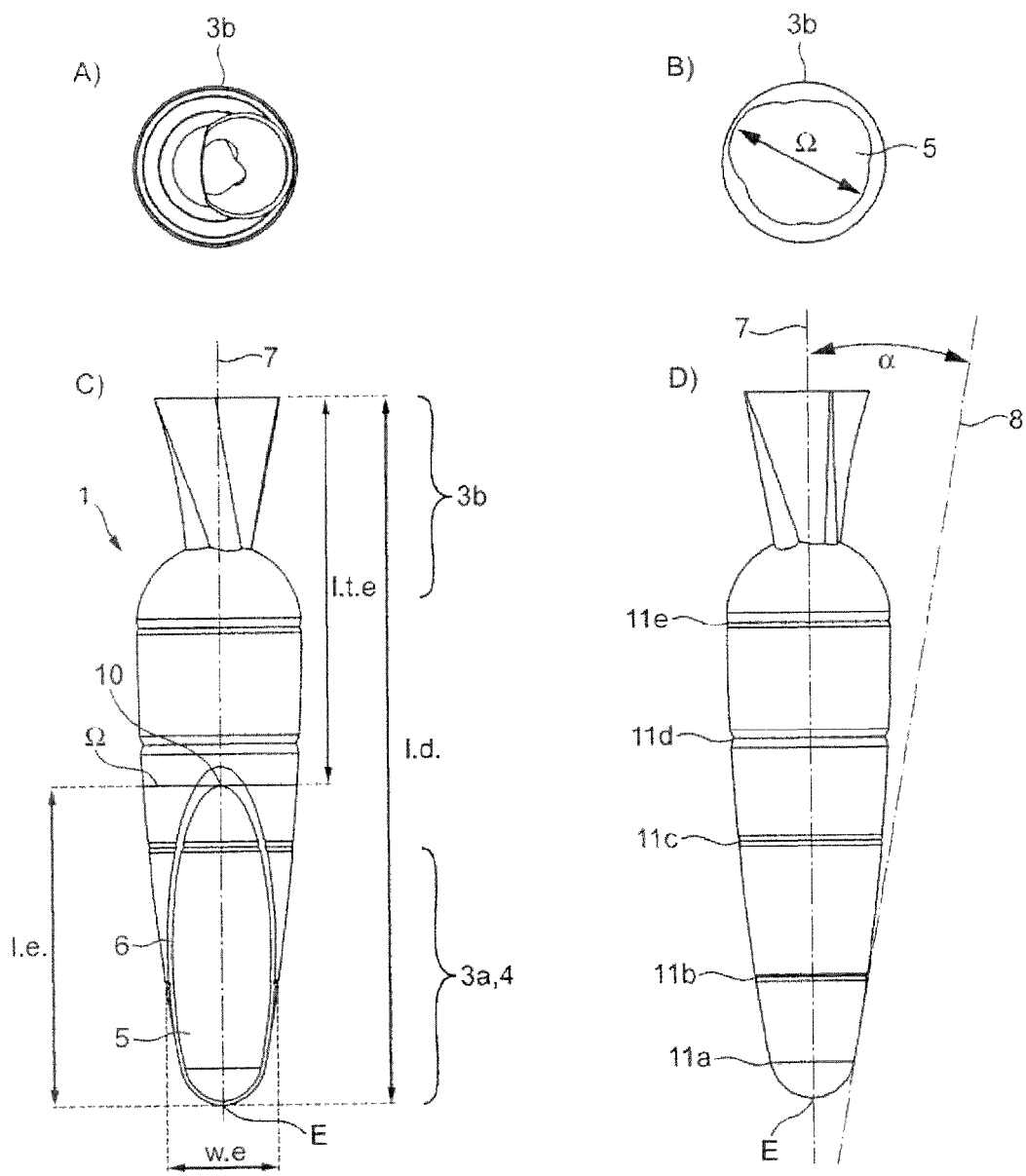
FIG. 3 represent several views of a device according to the invention, having a tubular shape, comprising a body with an irregular shape having an irregular variation of the diameter of the body along its length. The general shape of the device represents a carrot. It has two extremities:
  one of them has a V-shape and comprises an opening forming an ellipse
  the other extremity is closed and it comprises a design pattern (tail of the carrot).
Figure 3:
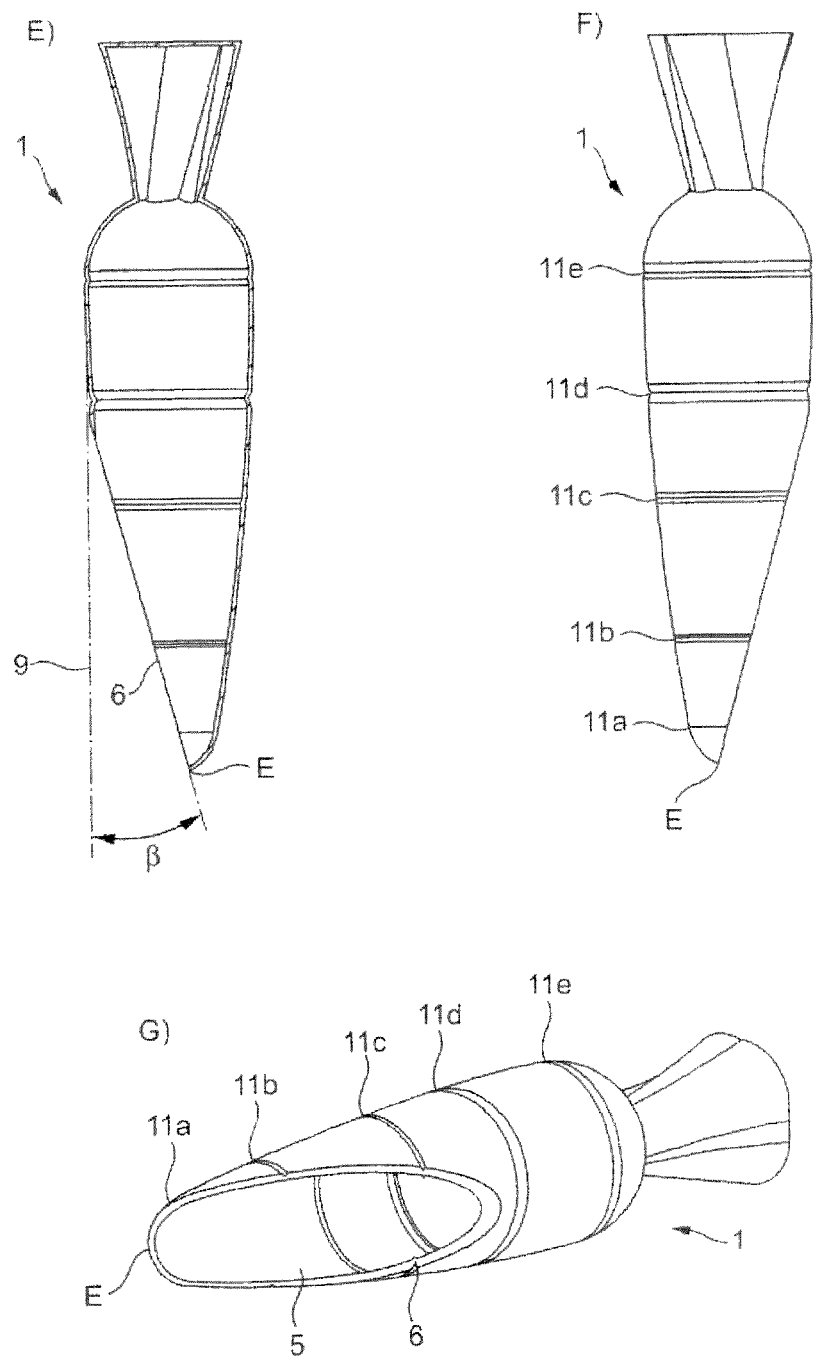
Figure 4:
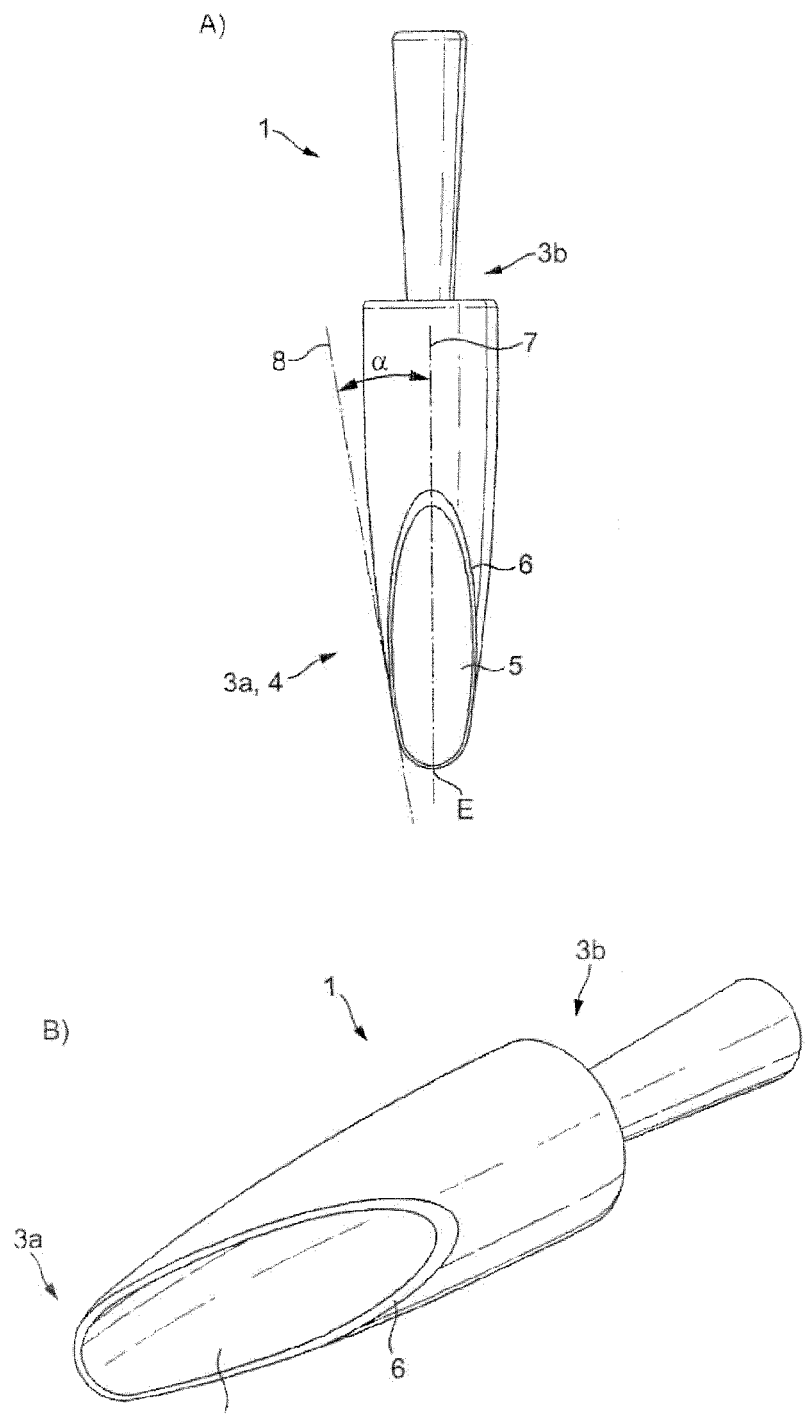
FIG. 4 represent another embodiment of the device according to the invention. It has a tubular shape and it comprises a body with an irregular shape with a regular variation of the diameter of the body along its length. It represents a kind of shovel. The device has two extremities:
  one of them has a V-shape and comprises an opening forming an ellipse
  the other extremity is closed and it comprises a design pattern (tube in the form of a queue).

The expressions "an opening of an ellipse form", "an opening having an ellipse form" and "an opening forming an ellipse" can be used interchangeably. They mean that the opening is oblique (slanting) to the length of the device and it is preferably cut sharp. The ellipse may be more or less regular, i.e. it can have a regular or irregular form, especially depending on whether E ends by a little circle (i.e. a curve) or by a peak. As previously mentioned, by the expression an opening forming an ellipse, it can be understood that only a part of the opening forms an ellipse (for example as illustrated in FIG. 2). In a particular embodiment, at least the upper part of the opening forms an ellipse. In another particular embodiment, the entire opening forms an ellipse (for example as illustrated in FIGS. 1, 3 and 4).

The "angle α" is the angle between i) the central and longitudinal axis (also called central longitudinal axis) of the device and ii) the tangential line formed by the V-shape of the at least one extremity (generally the bottom extremity). In the present invention it has to be lower than 10°.

The "angle β" corresponds to the inclination of the ellipse with the tangential and longitudinal axis which goes along the external side of the wall of the device (also called tangential longitudinal axis of the device). When the device is used vertically to the powder product (even if it can be used obliquely or horizontally), it therefore corresponds to the penetration angle of the device into the powdered product.

The expressions "a product under the powder form", "a powdered product", "a powder product", "a product having a powder form", "a product with a powder form" can be used interchangeably. They refer to a product having a granulated form. As previously mentioned the powdered product has generally a density from 200 to 600 g/L, for example from 250 to 580 g/L or from 250 to 480 g/L, and/or a particle size distribution and/or an average particle size distribution from 30 to 500 µm, and especially from 50 to 400 µm, such as from 80 to 300 µm, or from 100 to 200 µm, or from 120 to 180 µm. It may also contain some linking or agglomerate agents.

The powder product can be transferred via the device of the invention from a container to its place of use. By the expression "its place of use", it is intended to mean a new physical place that is different from the original container and wherein the powder product will either be directly employed (for consumption for example) or it will stay before a later use. Depending on the type of powder product and on the purpose of the powder transfer, it is generally a recipient such as for example a new container, a plate, a bowl, a cup, a baby's bottle or any other suitable items.

The expressions "kit", "kit of part" and "kit-of-part" can be used interchangeably in the present invention.

The verbs "transport" and "transfer" can be used interchangeably.

The verbs "deliver" and "dispense" can also be used interchangeably. They refer to the distribution or delivery of the powder product.

When the terms "generally" and "typically" are used in relation with a specific feature, this specific feature should not be considered as mandatory but rather as optional.

Some particular embodiments of the invention will now be described in more details with regard to the accompanying figures.

FIG. 1 shows a specific embodiment of the invention. It represents a device (1) according to the invention (front side view representation), having a tubular shape. It comprises a body (2) with a regular shape, i.e. the diameter of the body (2) is constant along its length. The device (1) has two extremities (3a, 3b):
  the extremity (3a) (or bottom extremity) has a V-shape (4) and comprises an opening (5a) forming an ellipse (6). As previously mentioned the angle α between the central and longitudinal axis (7) of the device (1) and the tangential line (8) formed by said V-shape (4) is typically from 4 to 9°, or from 5 to 8°. In a particular embodiment the angle α is 8°.
  The end E is made by a little curve.
  the extremity (3b) (or top extremity) comprises an opening (5b). As previously mentioned said opening (5b) can have various shapes. In this particular embodiment the opening (5b) is perpendicular to the length of the device.

In this embodiment, the device (1) contains four graduations (11a, 11b, 11c, 11d) made of nicks associated with a number indicating the filling level (encircled digital numbers 1, 2, 3 and 4). Each graduation is separated at a similar distance (d) from another one and the enclosed volume between two successive graduations (between 11a and 11b for example) is similar to the enclosed volume between two other successive graduations (between 11b and 11c or between 11c and 11d).

This particular embodiment may be particularly suitable for example when it is used by mothers for delivering/dosing infant formulas or infant cereals.

FIG. 2 is another embodiment of the invention. It represents a device (1) having a tubular shape (front side view representation), comprising a body (2) with a funnel shape, which is an irregular shape having a regular variation of the diameter of the body (2) along its length.

The device (1) has two extremities (3a, 3b):
  the extremity (3a) (or bottom extremity) has a V-shape (4) and comprises an opening (5) forming an ellipse (6). In a particular embodiment the angle α is 6°. The end E is made by a peak and the ellipse (6) has therefore an irregular form.
  the extremity (3b) (or top extremity) is closed.

In this embodiment, the device (1) contains three graduations (11a, 11b, 11c) made of single lines surrounding entirely the device (1). The distance (d1) separating two successive graduations (between 11a and 11b) is different from the distance (d2) separating two other successive graduations (between 11b and 11c)—in the present case d1>d2—but the enclosed volume between these two sets of successive graduations is similar.

FIG. 3 represent several views of a device (1) according to the invention. It has the shape of a carrot. It is made of a rigid plastic material using a 3D printer. This device would be particularly suitable for products like cacao powder for example. The device (1) has two extremities (3a, 3b):
  the extremity (3a) (or bottom extremity) has a V-shape (4) and comprises an opening (5) forming an ellipse (6). The end E is made by a little curve. In a particular embodiment the angle α is 7°.
  the extremity (3b) (or top extremity) is closed and it comprises a design pattern (tail of the carrot). This pattern is part of the general design (carrot) of the device but it also helps the consumer to better handle it. The tube may be in orange colour and the tail in green to better remind the appearance of this particular vegetable.

FIG. 3A is a view of the device (1) from the upper side, that is to say at the extremity (3b), which is the tail of the carrot.

FIG. 3B is a view of the device (1) from the down side, that is to say at the extremity (3a). The opening (5) is represented, as well as the largest extremity (3b). The diameter Ω of the body (2) measured at the top (10) of the ellipse (6) is also represented in this figure. It has a value of 18.7 mm in a particular embodiment.

FIG. 3C is a front side view of the device (1). In a particular embodiment, the device (1) has a total length (l.d.) of 80 mm (the design pattern being included).

The end E is made by a little curve.

In a particular embodiment, the top (10) of the ellipse (6) is located at a distance (l.t.e) that is half of the length (l.d.) of the device (1), that is to say at a distance of 40 mm from the top of the device (1). The length (l.e.) of the ellipse will therefore also be 40 mm, the width (w.e.) of the ellipse will be 12 mm and the ratio between the length (l.e.) and the width (w.e.) of the ellipse will be 3.33. The diameter Ω of the body (2) measured at the top (10) of the ellipse (6) is also represented in this figure.

FIG. 3D is a hindsight view of the device (1). In this embodiment the device (1) comprises five graduations (11a, 11b, 11c, 11d, 11e) that are made by several nicks that completely surround the device (1). The thickness of the nicks is also different in the present example (0.9 mm for 11b, 1.2 mm for 11c, 2.3 mm for 11d), but they may also be similar in some other embodiments.

The distances (d) separating two successive graduations (11) as well as the enclosed volumes between them are all different. In a particular embodiment for example, 11a is located at 3 mm of the bottom, 11b at 15 mm, 11c at 32 mm, 11d at 45 mm and 11e at 59 mm (when measured from the middle of the nicks to the end of the bottom extremity 3a, i.e. to E). The distance between 11a and 11b is 12 mm, the distance between 11b and 11c is 17 mm, the distance between 11c and 11d is 13 mm and the distance between 11d and 11e is 14 mm.

In this particular embodiment the cross-section of the tube forms an oval. The diameter of the device (i.e. of the tube) varies along its length: it is for example at 13.3 mm at 11b, it is 17.4 mm at 11c, it is 18.5 mm at 11d and it is 18.7 mm (=diameter Ω) at the top (10) of the ellipse (6). The width of the tube also varies along its length and it is smaller than the diameter of the device in this embodiment: it is for example 9 mm at 11b and 15.5 mm at 11c.

FIGS. 3E and 3F are side views of the device (1). The angle β, corresponding to the inclination of the ellipse (6) with the tangential and longitudinal axis (9) of the device (1), is 15° in a particular example.

FIG. 3G is a 3D view of this particular device (1).

So in a particular embodiment, the device described in FIG. 3 has the following measures:
- angle α=7°
- diameter Ω=18.7 mm
- I.d.=80 mm
- I.t.e=40 mm
- I.e.=40 mm
- w.e.=12 mm
- several graduations (for example 5)

Of course, various embodiments can exist. For example the different lengths, diameters, angles mentioned in the different figures can be modified to provide many other suitable devices covered by the present invention. By way of example, another suitable embodiment could be the device described in FIG. 3 but having the following measures:
- angle α=8°
- diameter Ω=15 mm
- I.d.=70 mm
- I.t.e=42 mm
- I.e.=38 mm
- w.e.=10 mm
- several graduations, for example three graduations 11a, 11b, 11c made by nicks having a thickness of 2 mm and spaced from a distance of 14 mm Another embodiment could be the device described in FIG. 3 but having the following measures:
- angle α=5°
- diameter Ω=23 mm
- I.d.=90 mm
- I.t.e=50 mm
- I.e.=40 mm
- w.e.=11 mm
- no graduation FIG. 4 represent another embodiment of the device (1) according to the invention. FIG. 4A is a representation of the front view of the device and FIG. 4B is a 3D view. The device (1) has a tubular shape and it comprises a body (2) having an irregular shape with a regular variation of the diameter of the body (2) along its length. It is rigid. It represents a kind of shovel and it may be in a colour like gold to remind the spirit of the coffee world. This device (1) would be particularly suitable for products like coffee powder for example.

The device (1) has two extremities (3a, 3b):
- one of them (3a) has a V-shape (4) and comprises an opening (5) forming an ellipse (6). In a particular embodiment the angle α between the central and longitudinal axis (7) of the device (1) and the tangential line (8) formed by said V-shape (4) is 7°
- the other extremity (3b) is closed and it comprises a design pattern (tube in the form of a queue).

In a particular embodiment, the measures are the following ones:
- diameter Ω=18.7 mm
- I.d.=111 mm
- I.t.e=73 mm
- I.e.=38 mm
- w.e.=10 mm
- And there is no graduation.

Figure 5:
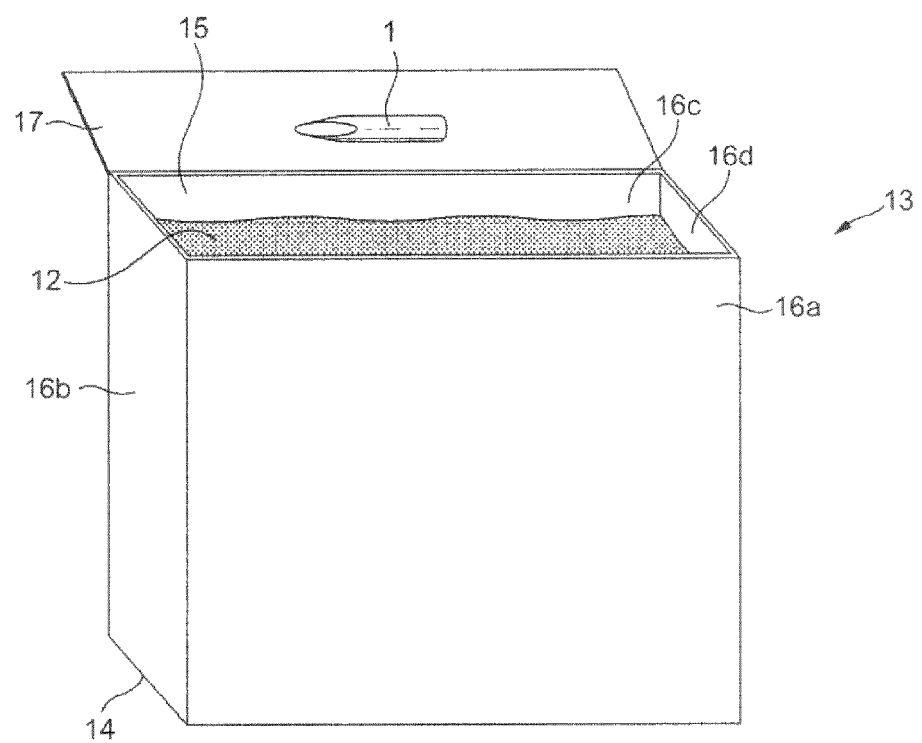
FIG. 5 represents a kit of part according to the invention.

FIG. 5 represents a kit of part according to the invention. It comprises the device (1) of the invention and a container (13) containing some powder product (12). The container (13) is a box with one bottom (14), one opening (15) that allows the consumer having access to the powder product (12). It has also four sides (16a, 16b, 16c, 16d) and one lid (17) allowing to close the box.

The device (1) of the present invention is attached to the lid (17) of the container (13) with gluing strips (not shown) so that it can be easily grabbed to be later used to extract, contain, transport, deliver and/or dose some powdered product (12).

Figure 6:
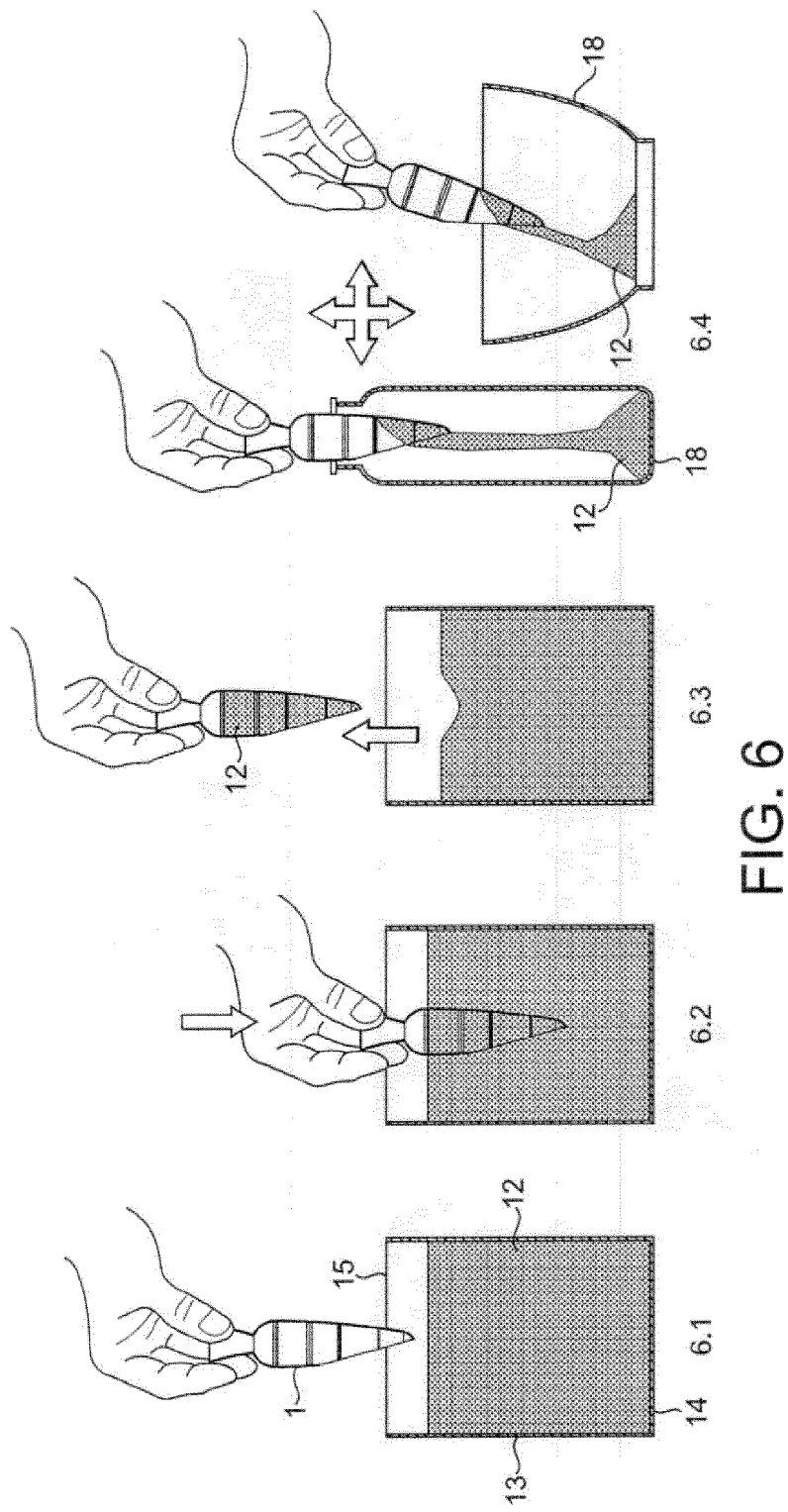
FIG. 6 represent different steps of using the device according to the invention in order to extract, contain, transport, deliver and/or dose the powdered product.

FIG. 6 represent some of the different steps of using the device according to the invention in order to extract, contain, transport, deliver and/or dose the powdered product. In a first step illustrated by FIG. 6.1, the device (1) of the invention (which can be the carrot device represented in FIG. 3) is vertically placed on top of the container (13), said container (13) comprising a base (14), an opening (15) being open to get access to the content of the container (13) and containing some powder product (12).

Then, as illustrated by FIG. 6.2, the device (1) is inserted by the consumer (with his hand) vertically into the powder product (12) of the container (13), by pressing the device (1) until a certain level (e.g. up to the last graduation).

Next step is illustrated by FIG. 6.3. The device (1) is removed vertically. It now contains some powder product (12) inside.

The powder product (12) is then transferred (not illustrated in the figures) from the container (13) to its place of use (18), by a simple move of the hand for example.

As illustrated by FIG. 6.4, the powder product (12) is finally delivered to its place of use (18), such as a baby's bottle for infant formula or infant cereals for instance, or a bowl for coffee powder or cacao powder for example.

Figure 7:
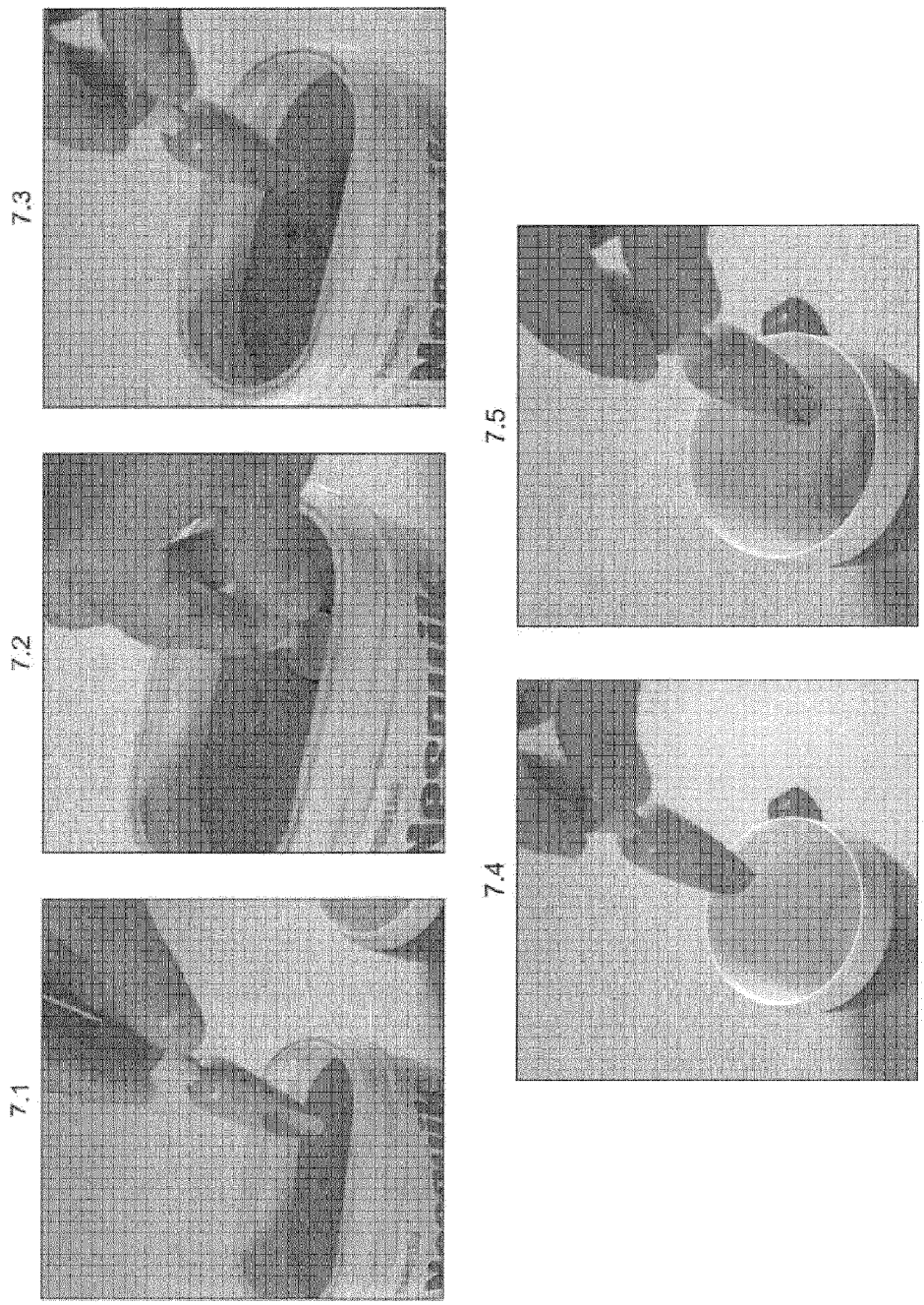
FIG. 7 are photos representing different steps of using the device according to the invention on cacao powder.

The photos of FIG. 7 represent different steps of using the device according to the invention on cacao powder such as Nesquik® powder from Nestle.

In 7.1, the carrot device from FIG. 3 is vertically placed on top of the plastic Nesquik container.

Then, as illustrated by FIG. 7.2, the device is inserted by the consumer (with his hand) vertically into the cacao powder of the plastic Nesquik container, by pressing the carrot device until a certain level (e.g. up to the last graduation). As illustrated by FIG. 7.3 the device is then removed vertically. It now contains some cacao powder inside. The cacao powder is then transferred (not shown in the figures) from the plastic Nesquik container to a cup. As finally illustrated by FIGS. 7.4 and 7.5, the cacao powder product is finally delivered into the cup by tapping the carrot device on the cup.

Figure 8:
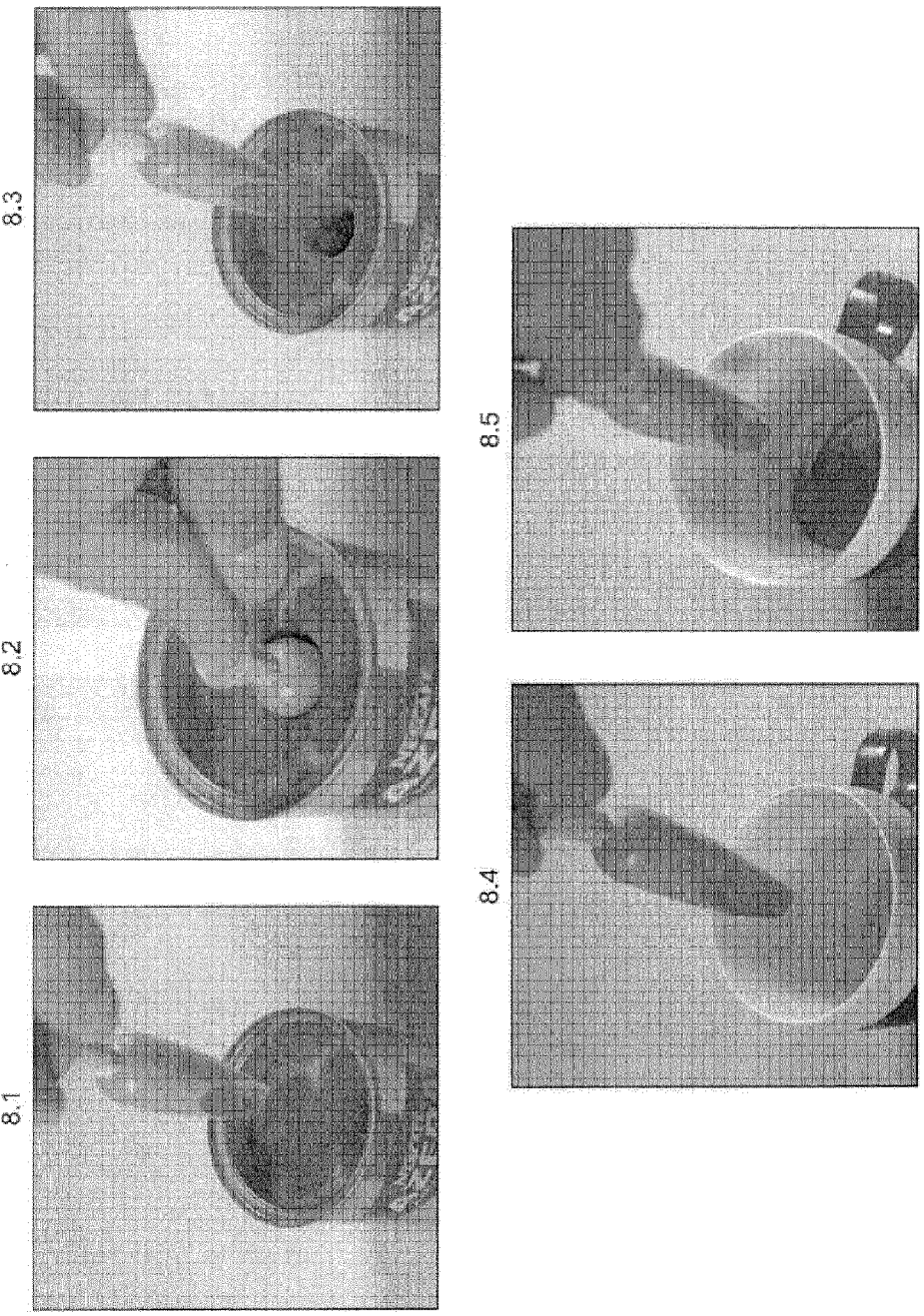
FIG. 8 are photos representing different steps of using the device according to the invention on coffee powder.

The photos of FIG. 8 are photos representing different steps of using the device according to the invention on coffee powder such as Nescafe Azera® from Nestle.

In 8.1, the carrot device from FIG. 3 is vertically placed on top of the tin can container containing the coffee powder. Then, as illustrated by FIG. 8.2, the device is inserted by the consumer (with his hand) vertically into the coffee powder of the tin can container, by pressing the carrot device until a certain level (e.g. up to the last graduation). As illustrated by FIG. 8.3 the device is then removed vertically. It now contains some coffee powder inside. The coffee powder is then transferred (not shown in the figures) from the tin can container to a cup. As finally illustrated by FIGS. 8.4 and 8.5, the customer finally delivers the coffee powder product into the cup by tapping the device with his fingers.

Figure 9:
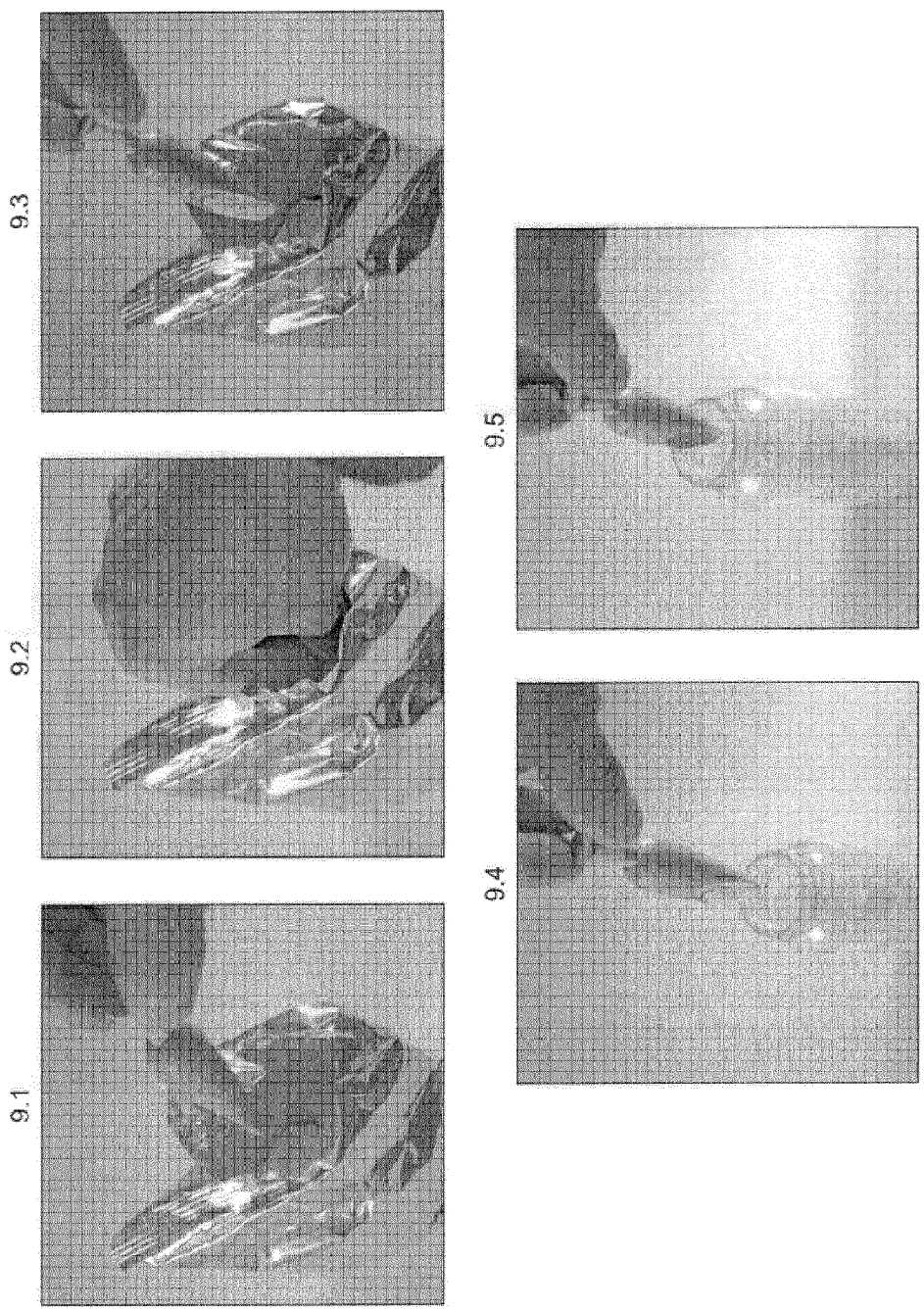
FIG. 9 are photos representing different steps of using the device according to the invention on infant cereals.

FIG. 9 are photos representing different steps of using the device according to the invention with infant cereals.

In 9.1, the carrot device from FIG. 3 is vertically placed on top of the flexible pack (or pouch) container containing the infant cereals powder. Then, as illustrated by FIG. 9.2, the device is inserted by the consumer (with his hand) vertically into the infant cereals powder of the flexible pack container, by pressing the carrot device until a certain level (e.g. up to the last graduation). As illustrated by FIG. 9.3 the device is then removed vertically. It now contains some infant cereals powder inside. The infant cereals powder is then transferred (not shown in the figures) from the flexible pack container to a baby's bottle. As finally illustrated by FIGS. 9.4 and 9.5, the infant cereals powder product is finally delivered into the baby's bottle by tapping the device on the baby's bottle.

Other kinds of devices have also been tested.

In an experiment A, several devices have been produced and tested. They all have one extremity (the bottom extremity) having a V-shape and comprising an opening forming an ellipse, and wherein the angle α between the central and longitudinal axis of the device and the tangential line formed by said V-shape was 10°. The total length (I.d.) of these devices was 80 mm. Different lengths (I.e.) and widths (w.e.) of the ellipse have been tested:

37 mm×10 mm
41 mm×11 mm
47 mm×13 mm
50 mm×14 mm

In each case, the device was not able to suitably retain the powder product as this one (or a majority thereof) has slipped. These devices are not part of the invention. Having an angle α lower than 10° is therefore an essential feature for the device according to the invention.

Other devices have been manufactured for an experiment B. They all have one extremity (the bottom extremity) having a V-shape and comprising an opening forming an ellipse. The total length (I.d.) of these devices was 80 mm, as for the experiment A. Different angles α were tested as well as various lengths (I.e.) and widths (w.e.) for the ellipse:

angle α=9°, I.e.×w.e.=42 mm×11 mm
angle α=9°, I.e.×w.e.=38 mm×10 mm
angle α=8°, I.e.×w.e.=38 mm×10 mm
angle α=7°, I.e.×w.e.=41 mm×12 mm
angle α=7°, I.e.×w.e.=50 mm×13 mm
angle α=5°, I.e.×w.e.=40 mm×10 mm
angle α=5°, I.e.×w.e.=40 mm×11 mm In each case, the device was able to suitably retain and deliver the powder product. These devices are part of the invention.

In an experiment C, other devices have been manufactured. They all have one extremity (the bottom extremity) having a V-shape and comprising an opening forming an ellipse, and the length (I.d.) was similar than for experiments A and B. The following angles α as well as an ellipse with these various lengths (I.e.) and widths (w.e.) have also been tested:

angle α=5°, I.e.×w.e.=28 mm×9 mm
angle α=7°, I.e.×w.e.=28 mm×10 mm
angle α=7°, I.e.×w.e.=35 mm×10 mm These devices are also part of the invention. They are however a little bit less convenience that the devices of experiment B due to the shorter lengths of the ellipse that render them a little bit more complicated (but still possible) to fill and to empty. A length (I.e.) of the ellipse between 38 mm to 50 mm (as in experiment B) is therefore particularly advantageous.

For each experiment A, B and C, the devices have been tested following the process as described in the present invention (i.e. test T), and particularly by:

a) positioning the device (empty) on top of the container, said container being open and containing some powder product (in the present case, it was a cacao powder of a density of 480 g/L and with an average particle size distribution of 156 μm)
b) inserting said device into the powder product by pressing it until a certain level (that was close to the top of the device)
c) removing the device, and assessing whether the device now comprises (retains) some powder product inside
d) transferring the powder product from the container to its place of use (a cup)
e) delivering the powder product into its place of use (a cup)

The suitability of a device for the present invention was determined depending on whether it succeeds all the different steps a) to e), and especially whether it was able to suitably retain the powder product (or a majority thereof, e.g. at least 80% or at least 85% or at least 90% or at least 92% or at least 95% or at least 98% or at least 99% of the product that enters into the device at step b)), when performing step c).

Steps a), b) and c) were made vertically. For the devices that provide suitable results, other successful trials were made using the device obliquely and also horizontally. Other successful trials were also obtained when adding a step b') after step b) and before step c), said step b') consisting of twisting the device on a certain degree. Several degrees have also been tested (45°, 90°, 180°) and they all provide satisfactory results.

In another set of experiments, several types of products have also been tested using the device from FIG. 3. The devices of the invention are particularly suitable for these following products:

powdered cacao products with a density of 480 g/L and of 580 g/L, and with a particle size distribution between 50 to 400 μm with an average particle size distribution of 156 μm (NESQUIK®, Nestle)
powdered infant cereals with a density of 250 g/L (Baby cereals good Night, Nestle)
powdered infant formula with a density of 450 g/L
powdered coffee product (NESCAFE Azera®) with a density of 270 g/L
powdered bouillons (Maggi Bouillon, Legums, beef and veal)

Some liquid products and viscous products (gels, jellies, ices, jams, marmalades) have also been tested and the devices of the invention are less convenient or not particularly suitable with these products that are not in powder form.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims or parts of the description, may possibly be advantageously combined, and the mentioning of these features in different claims or parts of the description does not exclude that a combination of features is not possible and advantageous.

The invention claimed is:

1. A device having a tubular shape, the device comprising:
    a body; and
    a first extremity that, has a V-shape and comprises an opening forming an ellipse, and an angle α between a central longitudinal axis of the device and a tangential line formed by the V-shape is lower than 10°.

2. The device according to claim 1, wherein the body of the device has a shape selected from the group consisting of a regular shape, an irregular shape and combinations thereof.

3. The device according to claim 1, further comprising a second extremity comprising an opening.

4. The device according to claim 1, further comprising a second extremity that is closed.

5. The device according to claim 1, wherein the angle α is from 4 to 9.5°.

6. The device according to claim 1, wherein an angle β corresponding to an inclination of the ellipse with the tangential and longitudinal axis of the device is from 5 to 30°.

7. The device according to claim 1, wherein a length of the device is from 60 to 180 mm.

8. The device according to claim 1, wherein a diameter Ω of the body at a top of the ellipse is from 10 to 40 mm.

9. The device according to claim 1, wherein a length of the ellipse is between 25 mm to 55 mm.

10. The device according to claim 1, wherein a width of the ellipse is between 9 mm to 14 mm.

11. The device according to claim 1, wherein a ratio between a length and a width of the ellipse is between 3 and 5.

12. The device according to claim 1, comprising at least one graduation.

13. The device according to claim 1, wherein the device is rigid and made of plastic.

14. The device according to claim 1, wherein the device has a shape of an item selected from the group consisting of fruit, vegetable and animal.

15. The device according to claim 1, wherein the device is configured to extract, contain, transport, deliver and/or dose a powdered product.

16. A kit comprising a container and a device having a tubular shape, the device comprising a body and at least two extremities, at least one of the at least two extremities has a V-shape and comprises an opening forming an ellipse, and an angle α between a central longitudinal axis of the device and a tangential line formed by the V-shape is lower than 10°.

17. The kit according to claim 16, wherein the container contains a powdered product.

18. A process to extract, contain, transport, deliver and/or dose a powdered product comprising the following steps:
    positioning on top of a container a device having a tubular shape, the device comprising a body and at least two extremities, at least one of the at least two extremities has a V-shape and comprises an opening forming an ellipse, and an angle α between a central longitudinal axis of the device and a tangential line formed by the V-shape is lower than 10°, the container being open and containing the powdered product;
    inserting the device into the powdered product;
    removing the device, the device now containing the powdered product inside; and
    transferring the powdered product from the container to a place of use of the powdered product.

19. The process according to claim 18, comprising twisting the device on a degree from 5 to 360 degrees after the inserting step.

20. The process according to claim 18, wherein the powdered product has a density from 200 to 600 g/L and/or a particle size distribution and/or an average particle size distribution from 30 to 500 μm.

21. The process according to claim 18, wherein the powdered product is a food product.

22. The process according to claim 18, wherein the device is inserted vertically into the container such that during the insertion, the central longitudinal axis of the device maintains a perpendicular position relative to a bottom side of the container.

* * * * *